United States Patent
Turner et al.

(10) Patent No.: US 7,661,486 B2
(45) Date of Patent: *Feb. 16, 2010

(54) POWER TOOL WITH BATTERY PACK EJECTOR

(75) Inventors: Terry L Turner, Finksburg, MD (US); David C Campbell, Bel Air, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/652,915

(22) Filed: Aug. 29, 2003

(65) Prior Publication Data

US 2004/0072064 A1    Apr. 15, 2004

Related U.S. Application Data

(63) Continuation of application No. 09/938,202, filed on Aug. 24, 2001, now Pat. No. 6,729,413.

(51) Int. Cl.
*E21B 4/12*    (2006.01)

(52) U.S. Cl. ............... 173/217; 173/216; 173/104; 173/117; 310/40; 310/50

(58) Field of Classification Search ........... 173/104, 173/117, 216, 217; 310/47, 50; 429/97
See application file for complete search history.

(56) References Cited

U.S. PATENT DOCUMENTS

| | | | |
|---|---|---|---|
| 2,261,230 A | 11/1941 | Cox et at |
| 2,460,149 A | 1/1949 | Schoensiegel |
| 3,120,845 A | 2/1964 | Horner |
| 3,494,799 A | 2/1970 | Pedone, Jr. |
| 3,734,207 A | 5/1973 | Fishbein |
| 3,943,934 A | 3/1976 | Bent |
| 3,999,110 A | 12/1976 | Ramstrom et al. |
| 4,050,528 A | 9/1977 | Foltz et al. |
| 4,091,880 A | 5/1978 | Troutner et al. |
| 4,146,682 A | 3/1979 | Nakao |

(Continued)

FOREIGN PATENT DOCUMENTS

DE        3502449        8/1985

(Continued)

*Primary Examiner*—Stephen Garbe
*Assistant Examiner*—Nathaniel Chukwurah
(74) *Attorney, Agent, or Firm*—Harness, Dickey & Pierce, P.L.C.

(57) ABSTRACT

A power tool has a mechanism for ejecting a battery pack which includes a receiving frame which defines a cavity to receive a battery pack. A receiving member is adjacent the cavity. The receiving member meshes with a member on the battery pack to hold the battery pack in the cavity. A biasing member is in the cavity adjacent the receiving member. The biasing member ejects the battery pack from the ejecting mechanism. A member retains the biasing member in the cavity. The member guides a portion of the battery pack meshing with the receiving member into contact with the biasing member such that when the battery pack is locked onto the frame, the biasing member is in a compressed condition and when the battery pack is an unlocked position, the biasing member ejects the battery pack from the frame.

34 Claims, 3 Drawing Sheets

U.S. PATENT DOCUMENTS

| | | | |
|---|---|---|---|
| 4,191,917 A | 3/1980 | Brown et al. | |
| 4,371,594 A * | 2/1983 | Ohara et al. | 429/97 |
| 4,386,609 A | 6/1983 | Mongeon | |
| 4,441,563 A | 4/1984 | Walton, II | |
| 4,447,749 A | 5/1984 | Reeb, Jr. et al. | |
| 4,728,876 A | 3/1988 | Mongeon et al. | |
| 4,736,742 A | 4/1988 | Alexson et al. | |
| 4,751,452 A | 6/1988 | Kilmer et al. | |
| 4,834,092 A | 5/1989 | Alexson et al. | |
| 4,835,410 A | 5/1989 | Bhagwat et al. | |
| 4,871,629 A | 10/1989 | Bunyea | |
| 4,873,461 A | 10/1989 | Brennan et al. | |
| 5,026,384 A | 6/1991 | Farr et al. | |
| 5,089,738 A | 2/1992 | Bergqvist et al. | |
| 5,122,427 A | 6/1992 | Flowers et al. | |
| 5,136,469 A | 8/1992 | Carusillo et al. | |
| 5,189,570 A * | 2/1993 | Maeda et al. | 360/75 |
| 5,207,697 A | 5/1993 | Carusillo et al. | |
| 5,208,525 A | 5/1993 | Lopic et al. | |
| 5,213,913 A | 5/1993 | Anthony, III et al. | |
| 5,225,293 A | 7/1993 | Mitchell et al. | |
| 5,235,261 A | 8/1993 | Philipp | |
| 5,242,767 A | 9/1993 | Roback et al. | |
| 5,244,755 A | 9/1993 | Benoist et al. | |
| 5,263,972 A | 11/1993 | Evans et al. | |
| 5,298,821 A | 3/1994 | Michel | |
| 5,306,285 A | 4/1994 | Miller et al. | |
| 5,308,716 A | 5/1994 | Shababy et al. | |
| 5,350,317 A | 9/1994 | Weaver et al. | |
| 5,360,073 A | 11/1994 | Akazawa | |
| 5,388,749 A | 2/1995 | Davignon et al. | |
| 5,394,073 A | 2/1995 | Nagai | |
| 5,399,446 A | 3/1995 | Takahashi | |
| D364,463 S | 11/1995 | Pitzen et al. | |
| 5,553,675 A | 9/1996 | Pitzen et al. | |
| 5,602,454 A | 2/1997 | Arakawa et al. | |
| 5,637,417 A | 6/1997 | Engmark et al. | |
| 5,660,945 A | 8/1997 | McCormick et al. | |
| 5,663,011 A * | 9/1997 | Bunyea et al. | 429/97 |
| 5,681,667 A | 10/1997 | Bunyea et al. | |
| 5,792,573 A | 8/1998 | Pitzen et al. | |
| 5,869,204 A | 2/1999 | Kottke et al. | |
| 5,881,823 A | 3/1999 | Kabatnik et al. | |
| 6,168,881 B1 | 1/2001 | Fischer et al. | |
| 6,223,835 B1 | 5/2001 | Habedank et al. | |
| 6,357,533 B1 | 3/2002 | Buchholz et al. | |
| 6,376,942 B1 | 4/2002 | Burger et al. | |
| 6,412,572 B2 | 7/2002 | Habedank et al. | |
| 6,502,949 B1 * | 1/2003 | Horiyama et al. | 362/119 |
| 6,656,626 B1 * | 12/2003 | Mooty et al. | 429/99 |

FOREIGN PATENT DOCUMENTS

| | | |
|---|---|---|
| DE | 9002514 | 8/1991 |
| DE | 4 208 804 | 9/1993 |
| DE | 43 31 187 C2 | 4/1998 |
| DE | 195 49 398 C2 | 4/1998 |
| DE | 100 40 893 A 1 | 8/2001 |
| EP | 0374600 | 6/1990 |
| EP | 0 707 350 A1 | 4/1996 |
| EP | 0 776 080 A2 | 5/1997 |
| EP | 0 778 627 A1 | 6/1997 |
| EP | 1 030 385 A1 | 8/2000 |
| EP | 1 030 386 A1 | 8/2000 |
| EP | 1 036 636 A1 | 9/2000 |
| EP | 1 128 517 A2 | 8/2001 |
| JP | 4-328937 | 11/1992 |
| WO | WO 91/03092 | 3/1991 |

* cited by examiner

POWER TOOL WITH BATTERY PACK EJECTOR

FIELD AND BACKGROUND OF THE INVENTION

The present invention relates to power tools and, more particularly, to battery operated power tools which include a mechanism for ejecting the battery from the tool.

In the power tool field, as battery technology improves, tradesmen are turning to battery operated tools. As the tradesmen utilize the battery operated tools, they desire tools with increased power, extended battery life, and longer durability. However, as tradesmen require more power and extended battery life, battery size and weight increase. As this occurs, it is desirable to have additional help to eject the batteries from the power tools.

Various types of battery ejectors exist in the field. Ordinarily, the batteries are surrounded by the housing and the biasing mechanism applies a force on the battery or battery pack near the electrical contact area. This is illustrated in U.S. Pat. No. 4,146,682 to Nakao; U.S. Pat. No. 5,681,667 to Bunyea et al; U.S. Pat. No. 5,225,293 to Mitchell et al; and U.S. Pat. No. 5,637,417 to Engmark et al.

U.S. Pat. No. 6,223,835 to Habedank et al, which is assigned to the assignee of the present invention, discloses a mechanism for assisting an ejecting battery from a power tool. The mechanism includes a cap which is biased by a spring or springs which are positioned within the housing. The cap acts upon the battery to apply a removal force onto the battery. Here, the top of the battery and the end of the battery are surrounded by the power tool housing.

The cited art does not provide a solution for ejecting a battery which is freely suspended by its coupling mechanism. In this case, the battery is supported on only one side and the remaining battery extends from the housing of the power tool. The majority of battery ejectors for these types of batteries are like those illustrated in U.S. Pat. No. 5,213,913. Here, the latching mechanisms, when moved, allow gravity to drop the battery from the housing. Thus, there was no need for a biasing force to remove the battery pack from the tool housing.

SUMMARY OF THE INVENTION

The present invention provides the art with a battery ejection mechanism which is utilized on batteries which are suspended from the power tool. The suspended battery includes rails which enable the battery to slide onto the power tool. The biasing member is positioned adjacent to the battery rails for ejecting the battery. Also, the biasing member is positioned in alignment such that the biasing member contacts the face of the rail mechanism of the battery to eject the battery. The battery is partly ejected from the tool housing so that it can be removed from the housing.

In accordance with a first aspect of the present invention, a mechanism for ejecting a battery comprises a frame with a cavity in the frame to receive a battery pack. A receiving member extends from the frame and is adjacent the cavity. The receiving member meshes with a member on the battery pack to maintain the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel.

In accordance with a second aspect of the invention, a power tool comprises a housing with a motor in the housing. An output is coupled with the motor. An activation member is included to activate the motor. A mechanism on the housing receives a battery pack. The mechanism includes a frame, with a receiving member and an adjacent cavity. The receiving member meshes with a member on the battery pack to hold the battery pack in the cavity. A biasing member is positioned in the cavity adjacent the receiving member. The biasing member ejects the battery pack from the ejecting mechanism. A member to retain the biasing member in the cavity is secured to the frame. The member guides the meshing portion of the battery pack with the receiving member into contact with the biasing member such that when the battery pack is locked onto the frame, the biasing member is in a compressed condition and when the battery pack is in an unlocked positioned the biasing member ejects the battery pack from the frame. The cavity is defined by a pair of opposing side walls and an end wall adjoining the opposing side walls. The receiving member includes a pair of rails extending from each side wall. The rails oppose one another. Channels are formed adjacent the side walls and between the rails and frame to receive mating rails on the battery pack. The biasing retaining member is adjacent the channel. The biasing retaining member is a tab extending from the side wall of the frame. The biasing member includes a pair of helical springs. The helical springs extend from the end wall and are aligned coincident with the channel. A battery pack is received in the battery pack receiving mechanism. The battery pack includes a pair of rails mating in the channels. The battery pack rails include an upper portion and a lower portion and a channel between the upper and lower portions. The extending tabs extend into the channel of the battery pack rails. The battery pack rails include end faces that abut the helical springs. The battery rails slide in the channels and the frame rails freely suspend the battery pack from the tool housing. The helical springs are positioned in the tool electrical connector housing.

From the following detailed description, taken in conjunction with the drawings and subjoined claims, other objects and advantages of the present invention will become apparent to those skilled in the art.

DETAILED DESCRIPTION OF THE PREFERRED EMBODIMENTS

Figure 1:
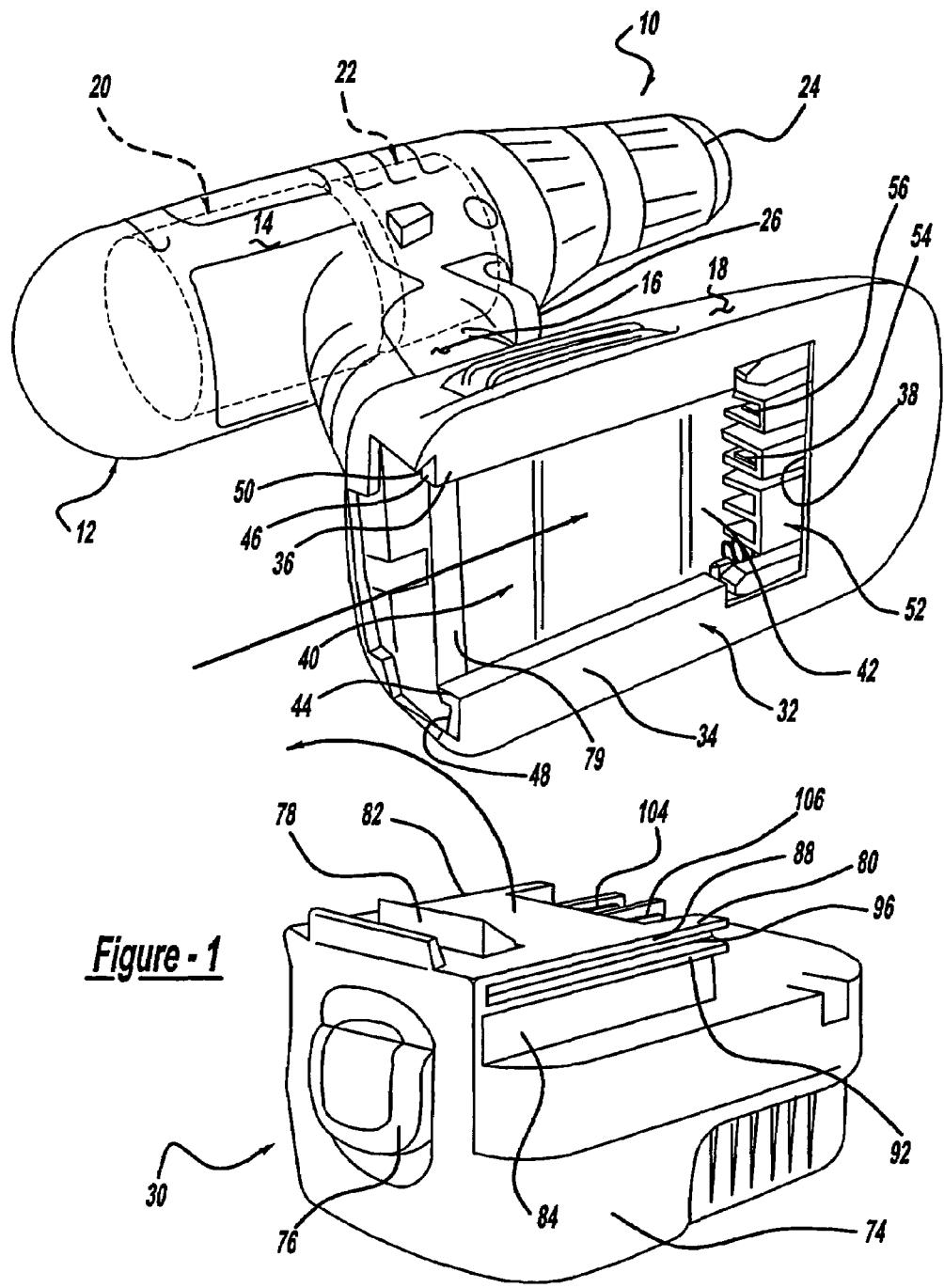
FIG. 1 is a bottom perspective view of a power tool in accordance with the present invention.
Figure 2:
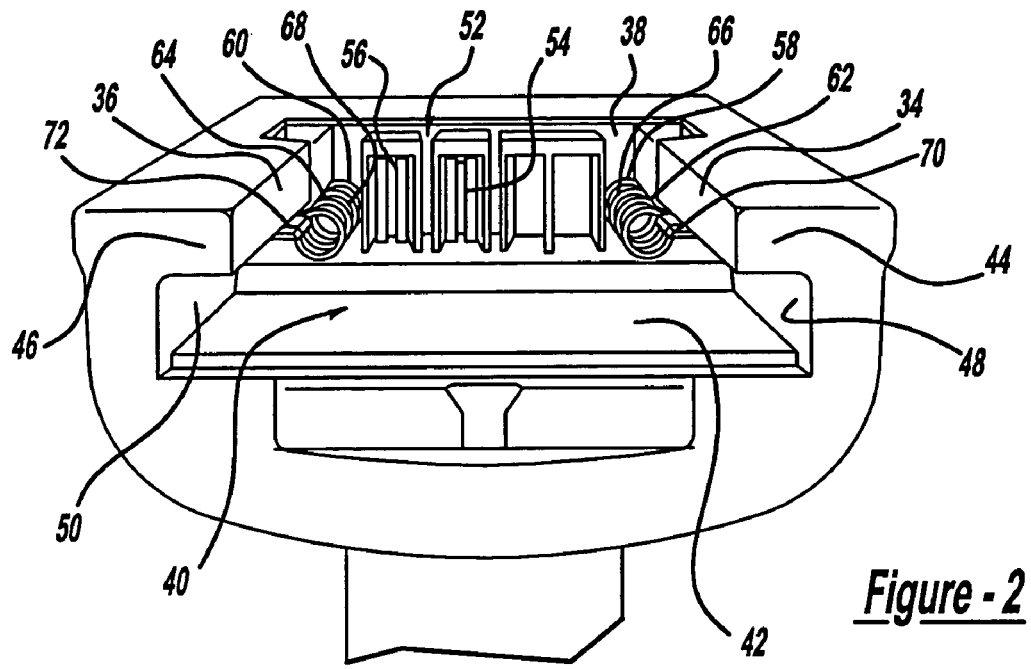
FIG. 2 is a side perspective view of the battery receiving mechanism of the drill of FIG. 1.

Turning to the figures, particularly FIG. 1, a power tool is illustrated and designated with the reference numeral 10. The power tool 10 includes a housing 12 which includes a motor portion 14 and a handle portion 16 as well as a base portion 18. A motor 20 is positioned in the housing 12. An output 22 is coupled with the motor 20 and in this case includes a chuck 24. An activation member 26 is positioned on the handle portion. The activation member is electrically coupled with the motor 20 as well as with a battery pack 30 which supplies the power to the power tool 10.

The housing base portion 18 includes a battery pack receiving frame 32. The battery pack receiving frame 32 includes a pair of opposing side walls 34 and 36 as well as an end wall 38. The side walls 34, 36 and end wall 38 define a battery receiving cavity 40. The cavity 40 is limited on the frame by a top wall or base 42. Each side wall 34, 36 includes a rail 44, 46. The rails 44, 46 extend longitudinally along the frame from an end of the housing base portion 18 towards the end wall 38. Channels 48, 50 are formed between the rails 44, 46 and the top wall 42. The channels 48, 50 receive the battery pack 30.

Figure 3:
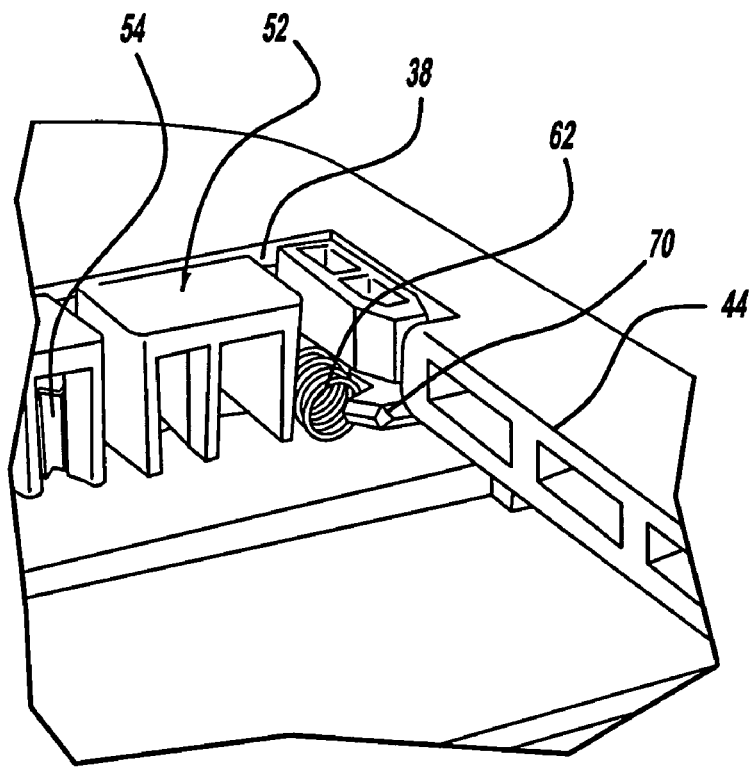
FIG. 3 is an enlarged perspective view of a portion of the receiving element of FIG. 2.
Figure 4:
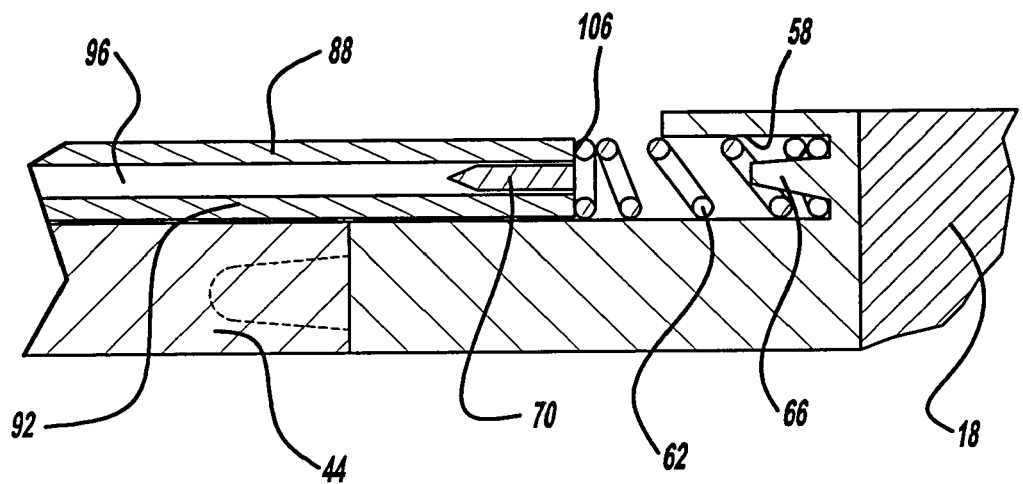
FIG. 4 is a cross-section view of FIG. 1.
Figure 5:
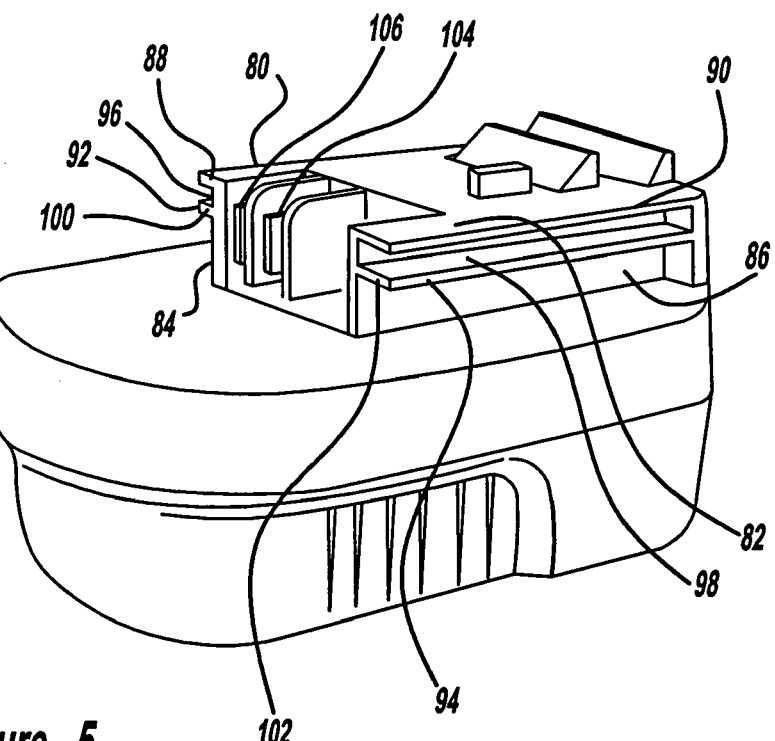
FIG. 5 is a perspective view of the battery removed from the tool.

An electrical connector housing 52 is coupled with the housing base portion 18 adjacent the end wall 38. The electrical connector housing 52 includes electrical connectors 54, 56 which couple with electrical connectors of the battery pack 30. The electrical connector housing 52 includes bores 58, 60 which receive helical springs 62, 64. Spring guides 66, 68 are positioned at the bottom of the bores 58, 60 to guide the helical springs 62, 64. Also, the guides 66, 68 maintain the springs in the bores 58, 60 during assembly. Tabs 70, 72 extend from the side walls 34, 36 of the receiving frame 32. The tabs 70, 72 capture the helical springs 62, 64 to maintain the springs 62, 64 in the bores 58, 60. The tabs 70, 72 are positioned between the rails and the top wall 42 aligned with the channels 48, 50 as seen in FIG. 3. The tabs 70, 72 are tapered from the frame 32 to the free end. Also, the tabs 70, 72 are tapered along their thickness as seen in FIGS. 3 and 4. The tapers assist in guiding the battery pack 30.

The battery pack 30 includes a housing 74 with a plurality of batteries (not shown) positioned within the housing. A release button 76 which is coupled with a latch 78 is positioned on the housing 74. The latch 78 secures the battery pack 30 to the top wall 42 of the housing base portion 18. The battery housing 74 includes rails 80, 82 longitudinally extending along the top surface of the battery pack 30. The rails define channels 84, 86 which mesh with the rails 44, 46 of the housing base portion 18. The rails 80, 82 include upper surfaces 88, 90 and lower surfaces 92, 94. The upper and lower surfaces define channels 96, 98. The rails 80, 82 are received in the channels 48, 50 of the housing base receiving frame 32. The battery pack 30 includes electrical connectors 104, 106. The electrical connectors 104, 106 are received in the electrical connectors 54, 56 for powering the power tool 10.

The battery pack 30 is coupled with the housing receiving frame 32 as follows. The battery pack rails 80, 82 are positioned in the frame channels 48, 50. The battery pack 30 is slid, rail upon rail, into the receiving frame 32 until the latch 78 secures in a catch 79 in the top wall 42. As this occurs, the battery rail faces 100, 102 abut the helical springs 62, 64. Prior to this happening, the battery rail channels 96, 98 receive the extending tabs 70, 72. The tabs 70, 72 guide the rails 80, 82 into contact with the springs 62, 64. The contacting of the springs 62, 64 by the battery rail faces 100, 102 occurs prior to the latch locking in the catch of the top wall 42. Accordingly, the springs 62, 64 compress into the bores 58, 60.

To release the battery pack 30 from the power tool 10, the button 76 is moved downwardly. As this occurs, the latch 78 also moves downwardly removing the latch from the catch 79 on the top wall 42. As this occurs, the battery pack 30 is no longer locked in position on the power tool housing receiving frame 32. At that time, the springs 62, 64, which are designed to have enough force to overcome the weight of the battery pack 30 and the terminal friction, eject the battery pack 30 away from the electrical connector housing 52. The battery pack 30 is ejected partially from the battery pack receiving frame 32. Also, the ejection disconnects the battery pack from the terminals.

While the above detailed description describes the preferred embodiment of the present invention, the invention is susceptible to modification, variation and alteration without deviating from the scope and fair meaning of the subjoined claims.

What is claimed is:

1. A power tool housing having a mechanism for ejecting a battery pack, comprising:
    a frame adjacent a free end of the power tool housing;
    said frame transverse to an axis passing through the free end of the power tool housing;
    a cavity in said frame for receiving a battery pack;
    a receiving member, said receiving member meshing with a member on the battery pack to hold the battery pack in the cavity, said receiving member transverse to the axis of the power tool;
    a biasing member in said cavity, said biasing member for ejecting said battery pack from said ejecting mechanism; and
    a member for retaining said biasing member in said cavity, said member for retaining said biasing member guiding the portion of the battery pack meshing with said receiving member into contact with said biasing member such that when the battery pack is locked onto said frame, said biasing member is in a compressed condition and when the battery pack is in an unlocked condition, said biasing member ejects the battery pack from the frame in a direction transverse to said axis.

2. The ejector mechanism according to claim 1, wherein said cavity defined by a pair of opposing side walls and an end wall adjoining said opposing side walls.

3. The ejector mechanism according to claim 2, wherein said receiving member including a pair of extending rails on each side wall, said rails opposing one another.

4. The ejector mechanism according to claim 3, wherein channels are formed adjacent said side walls and between said rails and frame for receiving mating rails on the battery pack.

5. The ejector mechanism according to claim 4, wherein said biasing retaining member being adjacent said channel.

6. The ejector mechanism according to claim 5, wherein said biasing retaining member being a tab extending from said side wall of said frame.

7. The ejector mechanism according to claim 5, wherein said biasing member extending from said end wall and aligned with said channel.

8. The ejector mechanism according to claim 1, wherein said biasing member including a pair of helical springs.

9. A power tool, comprising:
    a housing;

a motor in said housing;
an output coupled with said motor;
an activation member for activating said motor;
a mechanism on said housing for receiving a battery pack including:
a frame adjacent a free end of the power tool housing;
said frame transverse to an axis passing through the free end of the power tool housing;
a cavity in said frame for receiving a battery pack;
a receiving member, said receiving member meshing with a member on the battery pack to hold the battery pack in the cavity, said receiving member transverse to the axis of the power tool;
a biasing member in said cavity, said biasing member for ejecting said battery pack from said ejecting mechanism;
a member for retaining said biasing member in said cavity, said member for retaining said biasing member guiding the portion of the battery pack meshing with said receiving member into contact with said biasing member such that when the battery pack is locked onto said frame, said biasing member is in a compressed condition and when the battery pack is in an unlocked condition, said biasing member ejects the battery pack from the frame in a direction transverse to said axis; and
a battery pack.

10. The power tool according to claim 9, wherein said cavity defined by a pair of opposing side walls and an end wall adjoining said opposing side walls.

11. The power tool according to claim 10, wherein said receiving member including a pair of extending rails on each side wall, said rails opposing one another.

12. The power tool according to claim 11, wherein channels are formed adjacent said side walls and between said rails and frame for receiving mating rails on the battery pack.

13. The power tool according to claim 12, wherein said biasing retaining member being adjacent said channel.

14. The power tool according to claim 13, wherein said biasing retaining member being a tab extending from said side wall of said frame.

15. The power tool according to claim 14, wherein said biasing member extending from said end wall and aligned with said channel.

16. The power tool according to claim 9, wherein said biasing member including a pair of helical springs.

17. The power tool according to claim 9, wherein said battery pack including a pair of rails mating in said channels.

18. The power tool according to claim 17, wherein said battery pack rails including an upper portion, lower portion and a channel between said upper and lower portions.

19. The power tool according to claim 18, wherein said extending tabs extend into said channels of said battery pack rails.

20. The power tool according to claim 18, wherein said rails include end faces that abut said helical springs.

21. The power tool according to claim 20, wherein said helical springs partially eject said battery pack.

22. The power tool according to claim 17, wherein said battery rails slide in said channels and said frame rails suspend said battery pack from said tool housing.

23. A mechanism for ejecting a battery pack from the housing of a power tool, comprising:
a frame adjacent a free end of the power tool housing;
said frame transverse to an axis passing through the free end of the power tool housing;
a cavity in said frame for receiving a battery pack;
an electrical connector housing including electrical connectors for electrically connecting with the battery pack, said electrical connector housing coupled with the power tool housing and positioned in said cavity such that the connectors are arranged in a direction transverse to the axis of the power tool;
a receiving member, said receiving member meshing with a member on the battery pack to receive the battery pack in the cavity, said receiving member transverse to the axis of the power tool;
a biasing member in said cavity, said biasing member for ejecting said battery pack from said ejecting mechanism; and
a bore spaced and separate from said electrical connectors in said electrical connector housing, said bore adjacent said electrical connectors for receiving and maintaining said biasing member in said frame, said biasing member being in a compressed condition and directly contacting the battery pack when the battery pack is locked onto said frame when the battery pack is in an unlocked condition, said biasing member ejects the battery pack from the frame in a direction transverse to said axis.

24. The ejector mechanism according to claim 23, wherein said bore positioned in an end wall of said cavity.

25. The ejector mechanism according to claim 23, wherein said receiving member including a pair of extending rails on each side wall, said rails opposing one another.

26. The ejector mechanism according to claim 25, wherein channels are formed adjacent said side walls and between said rails and frame for receiving mating rails on the battery pack.

27. The ejector mechanism according to claim 23, wherein said biasing member extending from said end wall.

28. A power tool comprising:
a housing having a portion with a free end for receiving a battery pack, said housing portion defining an axis;
a motor in said housing;
an output coupled with said motor;
an activation member for activating said motor;
a battery pack;
a mechanism on said housing for receiving said battery pack including;
a frame;
a cavity in said frame for receiving said battery pack;
an electrical connector housing including electrical connectors for electrically connecting with the battery pack, said electrical connector housing coupled with said power tool housing and positioned in said cavity such that the connectors are arranged in a direction transverse to the axis of the power tool;
a receiving member, said receiving member meshing with a member on said battery pack to receive said the battery pack in the cavity, said receiving member transverse to the axis of the housing portion;
a biasing member in said cavity, said biasing member for ejecting said battery pack from said ejecting mechanism;
a bore spaced and separate from said electrical connectors in said electrical connector housing, said bore adjacent said electrical connectors for receiving and maintaining said biasing member in said frame, said biasing member being in a compressed condition and directly contacting the battery pack when the battery pack is locked onto said frame when said battery pack is in an unlocked condition, said biasing member ejects said battery pack from the frame in a direction transverse to said axis.

29. The power tool according to claim 28, wherein said bore positioned in an end wall of said cavity.

30. The power tool according to claim 29, wherein said receiving member including a pair of extending rails on each side wall, said rails opposing one another.

31. The power tool according to claim 30, wherein channels are formed adjacent said side walls and between said rails for receiving mating rails on said battery pack.

32. The power tool according to claim 28, wherein said biasing member extending from said end wall.

33. The power tool according to claim 28, wherein said biasing member partially eject said battery pack.

34. The power tool according to claim 28, wherein said battery rails slide in said channels and said frame rails suspend said battery pack from said tool housing.

\* \* \* \* \*